(12) United States Patent
Lin et al.

(10) Patent No.: US 9,194,704 B2
(45) Date of Patent: Nov. 24, 2015

(54) ANGULAR RATE SENSOR HAVING MULTIPLE AXIS SENSING CAPABILITY

(71) Applicant: FREESCALE SEMICONDUCTOR, INC., Austin, TX (US)

(72) Inventors: Yizhen Lin, Cohoes, NY (US); Dejan Mijuskovic, Tournefeuille (FR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 266 days.

(21) Appl. No.: 13/798,902

(22) Filed: Mar. 13, 2013

(65) Prior Publication Data

US 2014/0260608 A1 Sep. 18, 2014

(51) Int. Cl.
G01C 19/56 (2012.01)
G01C 19/5747 (2012.01)

(52) U.S. Cl.
CPC ....... *G01C 19/5747* (2013.01); *Y10T 29/49002* (2015.01)

(58) Field of Classification Search
CPC .............. G01C 19/5719; G01C 19/56; G01C 19/5607; G01C 19/5649; G01C 19/5642; G01C 19/5747; G01C 19/5762; G01P 15/18; G01P 15/0888; G01P 15/0802; G01P 15/097; G01P 15/125
USPC ............... 73/504.12, 504.14, 504.02, 504.04, 73/510, 511, 504.08
See application file for complete search history.

(56) References Cited

U.S. PATENT DOCUMENTS

| | | | |
|---|---|---|---|
| 6,892,575 B2 | 5/2005 | Nasiri et al. | |
| 7,694,563 B2 | 4/2010 | Durante et al. | |
| 8,272,267 B2 * | 9/2012 | Tamura et al. | 73/504.12 |
| 8,459,110 B2 * | 6/2013 | Cazzaniga et al. | 73/504.12 |
| 2002/0189351 A1 * | 12/2002 | Reeds et al. | 73/504.04 |
| 2006/0112764 A1 * | 6/2006 | Higuchi | 73/504.12 |
| 2007/0214883 A1 * | 9/2007 | Durante et al. | 73/504.04 |
| 2009/0064780 A1 * | 3/2009 | Coronato et al. | 73/504.08 |
| 2010/0263446 A1 * | 10/2010 | Tamura et al. | 73/504.12 |
| 2011/0030473 A1 * | 2/2011 | Acar | 73/504.12 |
| 2011/0154898 A1 * | 6/2011 | Cazzaniga et al. | 73/504.12 |
| 2012/0096943 A1 * | 4/2012 | Potasek et al. | 73/504.14 |
| 2013/0000404 A1 * | 1/2013 | Katsumata et al. | 73/504.12 |
| 2013/0167636 A1 * | 7/2013 | Coronato et al. | 73/504.12 |
| 2013/0239679 A1 * | 9/2013 | Kornilovich | 73/504.12 |
| 2014/0260610 A1 * | 9/2014 | McNeil et al. | 73/504.12 |
| 2014/0352431 A1 * | 12/2014 | Leclerc | 73/504.04 |

OTHER PUBLICATIONS

Tsai, et al. Design and Analysis of a Tri-Axis Gyroscope Micromachined by Surface Fabrication., pp. 1933-1940, IEEE Sensors Journal, vol. 8, No. 12, Dec. 2008.

* cited by examiner

*Primary Examiner* — Helen Kwok
(74) *Attorney, Agent, or Firm* — Charlene R. Jacobsen

(57) ABSTRACT

An angular rate sensor (20) includes a single drive mass (24) and distributed sense masses (36, 38, 40, 42) located within a central opening (30) of the drive mass (24). The drive mass (24) is enabled to rotate around the Z-axis (64) under electrostatic stimulus. The sense masses (36, 38, 40, 42) are coupled to the drive mass by spring elements (44, 46, 48, 50) such that oscillatory rotary motion (90) of the drive mass imparts a linear drive motion (92, 94) on the sense masses. The distributed sense masses form two pairs of sense masses, where one pair senses X- and Z-axis angular rate and the other pair senses Y- and Z-axis angular rate. The sense masses are coupled to one another via a centrally located coupler element (34) to ensure that the sense masses of each pair are moving in anti-phase.

20 Claims, 5 Drawing Sheets

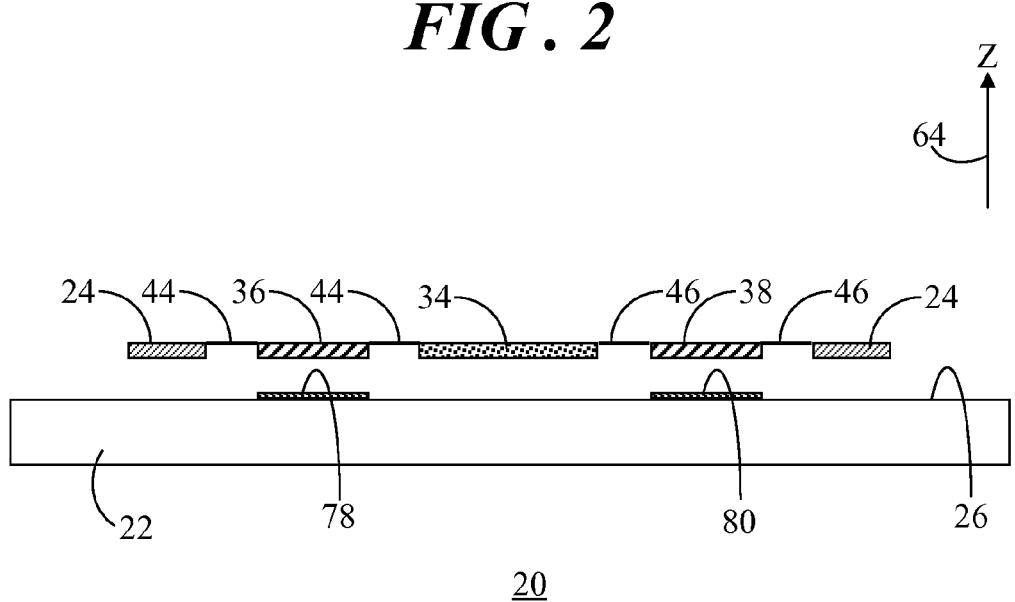
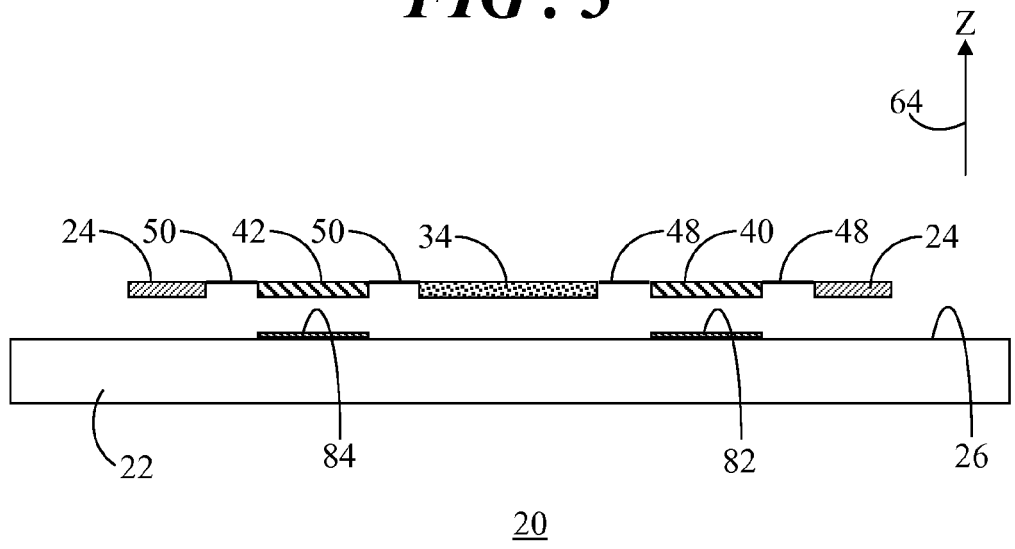

ANGULAR RATE SENSOR HAVING MULTIPLE AXIS SENSING CAPABILITY

TECHNICAL FIELD OF THE INVENTION

The present invention relates generally to microelectromechanical systems (MEMS) angular rate sensors. More specifically, the present invention relates to a MEMS angular rate sensor having multiple axis sensing capability.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. One example of a MEMS sensor is a MEMS angular rate sensor. An angular rate sensor senses angular speed or velocity around one or more axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

FIG. 2 shows a side view of the angular rate sensor along section lines 2-2 of FIG. 1;

FIG. 3 shows a side view of the angular rate sensor along section lines 3-3 of FIG. 1;

DETAILED DESCRIPTION

The sensing of angular velocity can be performed using an angular rate sensor. Angular rate sensors broadly function by driving the sensor into a first motion and measuring a second motion of the sensor that is responsive to both the first motion and the angular velocity to be sensed. Capacitive-sensing MEMS device designs for angular rate sensors are highly desirable for operation in miniaturized devices due to their low temperature sensitivity, small size, and suitability for low cost mass production.

As the uses for MEMS angular rate sensors continue to grow and diversify, increasing emphasis is being placed on the development of devices capable of sensing angular velocity about multiple axes of rotation. In addition, increasing emphasis is being placed on fabrication methodology for MEMS angular rate sensors that achieves multiple axis sensing capability without increasing manufacturing cost and complexity and without sacrificing part performance. These efforts are primarily driven by existing and potential high-volume applications in automotive, medical, commercial, and consumer products.

Embodiments disclosed herein entail a microelectromechanical systems (MEMS) device in the form of, for example, an angular rate sensor having a single drive mass and multiple distributed sense masses located within a central opening of the drive mass. The drive mass may be connected to an underlying substrate via spring anchorage structures that enable the drive mass to rotate around the Z-axis under electrostatic stimulus, which is the drive motion. Use of a single drive mass enables the implementation of a single drive frequency, which simplifies the drive circuitry and reduces cross talk. The sense masses may be coupled to the drive mass by spring elements such that oscillatory rotary motion of the drive mass imparts a linear drive motion on the sense masses. Additionally, the sense masses may be coupled to one another via a centrally located coupler to ensure that the sense masses of each pair of sense masses are moving one hundred eighty degrees out of phase with respect to each other. The distributed sense masses form two pairs of sense masses, where one pair senses X- and Z-axis angular rate and the other pair senses Y- and Z-axis angular rate. These features can enable multiple axis sensing capability, more efficient die area utilization, and suitability for low cost mass production.

Figure 1:
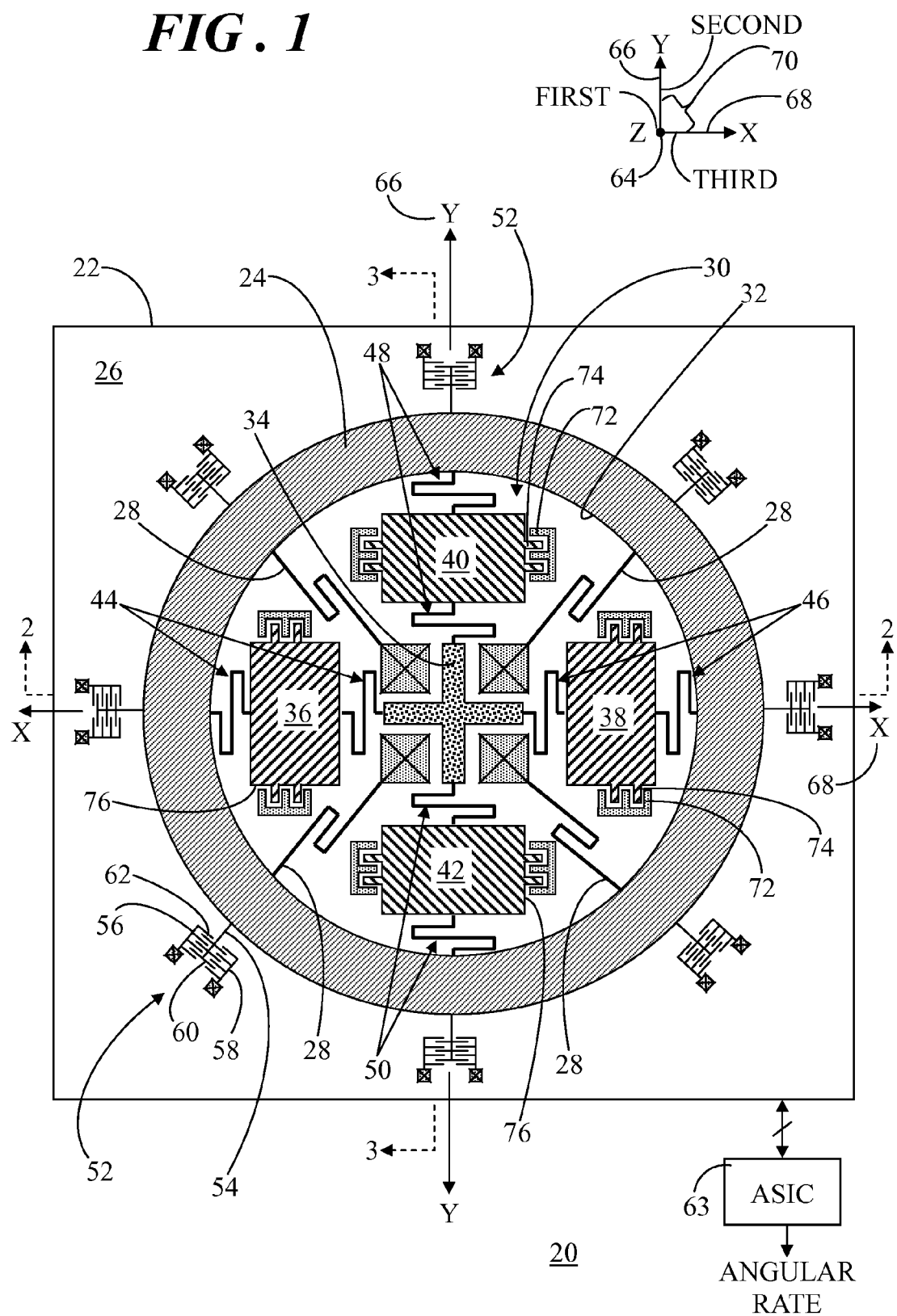
FIG. 1 shows a top view of a microelectromechanical systems (MEMS) angular rate sensor having multiple axis sensing capability in accordance with an embodiment.

FIG. 1 shows a top view of a microelectromechanical systems (MEMS) angular rate sensor 20 having multiple axis sensing capability in accordance with an embodiment. Angular rate sensor includes a substrate 22 and a drive mass 24 flexibly coupled to a surface 26 of substrate 22 by multiple spring anchorage structures 28. In an embodiment, drive mass 24 is a generally circular- or disk-shaped structure having a central opening 30, defined or circumscribed by an inner perimeter 32, extending through drive mass 24. Spring anchorage structures 28 reside in central opening 30. In addition, a coupler element 34 is located in and is approximately centered within central opening 30. In an embodiment, coupler element 30 is suspended above surface 26 of substrate 22. Although drive mass 24 is shown as being circular-shaped, drive mass 24 may be any closed polygonal shape in alternative embodiments.

Multiple distributed sense masses 36, 38, 40, and 42 also reside in central opening 34. In an embodiment, sense mass 36, referred to hereinafter as a first sense mass 36, is interconnected between inner perimeter 32 of drive mass 24 and coupler element 34 via first spring elements 44. Likewise, sense mass 38, referred to hereinafter as a second sense mass 38, is interconnected between inner perimeter 32 of drive mass 24 and coupler element 34 via second spring elements 46. Sense mass 40, referred to hereinafter as a third sense mass 40, is interconnected between inner perimeter 32 of drive mass 24 and coupler element 34 via third spring elements 48. And, sense mass 42, referred to hereinafter as a fourth sense mass 42, is interconnected between inner perimeter 32 of drive mass 24 and coupler element 34 via fourth spring elements 50.

Drive mass 24 is illustrated with upwardly and rightwardly directed narrow hatching, coupler element 34 is illustrated with a dark stippled pattern, first and second sense masses 36 and 38 are illustrated with upwardly and rightwardly directed wide hatching, and third and fourth sense masses 40 and 42 are illustrated with downwardly and rightwardly directed wide hatching to distinguish the different elements produced within the structural layers of angular rate sensor 20. These different elements may be produced utilizing current and upcoming surface micromachining techniques of depositing, patterning, etching, and so forth. Accordingly, although different shading and/or hatching is utilized in the illustrations, the different elements within the structural layers are typically formed out of the same material, such as polysilicon, single crystal silicon, and the like. In addition, the terms "first," "second," "third," "fourth," and so forth used herein do not refer to an ordering or prioritization of elements within a countable series of elements. Rather, the terms "first," "second," "third," and "fourth," are used to distinguish the particular elements for clarity of discussion.

The elements of angular rate sensor 20 may be described variously as being "attached to," "attached with," "coupled to," "connected to," or "interconnected with," other elements of angular rate sensor 20. However, it should be understood that the terms refer to the direct or indirect physical connections of particular elements of angular rate sensor 20 that occur during their formation through patterning and etching processes of MEMS fabrication.

In an embodiment, a drive system 52 includes a plurality of driven arms 54 extending externally from drive mass 24 in a radial direction and spaced apart at an equivalent angular distance. Drive system 52 further includes a plurality of driving arms 56 and 58 anchored to surface 26 of substrate 22. Driving arms 56 and 58 are arranged on opposite sides of respective driven arms 54. Each driven arm 54 carries a number of electrodes 60 extending in a direction perpendicular to, and on either side of, the driven arm 54. Likewise, each of driving arms 56 and 58 carries electrodes 62 extending toward the respective driven arm 54 and in alternating arrangement with electrodes 60.

Drive system 52 further includes a driving circuit (not shown) which may be included within an application specific integrated circuit (ASIC) 63 configured to apply voltage to electrodes 62. Spring anchorage structures 28 enable drive mass 24 to rotate about a first axis 64, typically referred to as a drive axis, at a given oscillation frequency under the electrostatic stimulus. Thus, drive system 52 produces an oscillatory rotary motion of drive mass 24 about first axis 64, typically referred to as a drive axis, at a given oscillation frequency. In alternative embodiments, a drive system may be located within central opening 30 of drive mass 24 and/or the drive system may include more or less than the illustrated quantity and configuration of arms and electrodes.

In the illustrated embodiment, the first axis, i.e., the drive axis, is the Z-axis in a three-dimensional coordinate system. As such, the drive axis will be referred to herein as Z-axis 64. In the three-dimensional coordinate system, the second axis will be referred to herein as a Y-axis 66 and the third axis will be referred to herein as an X-axis 68. Angular rate sensor 20 is thus illustrated as having a generally planar structure within an X-Y plane 70, where X-axis 68 and Y-axis 66 are substantially parallel to surface 26 of substrate 22 and Z-axis 64 extends out of the page, perpendicular to X-Y plane 70. It should be observed in the figures that the terms "first," "second," and "third" are paired with Z-axis 64, Y-axis 66, and X-axis 68, respectively. Again, the terms "first," "second," and "third" do not refer to an ordering or prioritization of the axes. Rather, the terms "first," "second," and "third" are shown in the illustrations paired with their respective axes for clarity and to provide correlation with like terms used in the claims.

In an embodiment, first and second sense masses 36 and 38, respectively, are positioned on opposing sides of Y-axis 66, i.e., the second axis, with coupler element 34 located between sense masses 36 and 38. Likewise, third and fourth sense masses 40 and 42, respectively, are positioned on opposing sides of X-axis 68, i.e., the third axis, with coupler element 34 located between sense masses 40 and 42. As will be discussed in greater detail below, first and second sense masses 36 and 38 are used to pick up, i.e., sense, angular velocity about two input axes, namely, X-axis 68 and Z-axis 64. Additionally, third and fourth sense masses 40 and 42 are used to pick up, i.e., sense, angular velocity about two input axes, namely, Y-axis 66 and Z-axis 64. Thus, angular rate sensor 20 may be considered a tri-axis angular rate sensor.

In order to detect angular velocity about Z-axis 64, angular rate sensor 20 includes fixed electrodes 72 (illustrated with a light stippled pattern) anchored to surface 26 of substrate 22. Angular rate sensor 20 further includes movable electrodes 74 extending from edges 76 of each of sense masses 36, 38, 40, and 42, where movable electrodes 74 are in alternating arrangement with fixed electrodes 72. As shown, fixed electrodes 72 and movable electrodes 74 extending from each of first and second sense masses 36 and 38 are longitudinally aligned with (i.e., parallel to) Y-axis 66 (i.e., the second axis in the three-dimensional coordinate system described herein). Conversely, fixed electrodes 72 and movable electrodes 74 extending from each of third and fourth sense masses 40 and 42, respectively, are longitudinally aligned with (i.e., parallel to) X-axis 68 (i.e., the third axis in the three-dimensional coordinate system described herein). Detection of angular velocity about Z-axis 64 will be discussed in connection with FIG. 7.

Referring to FIG. 2 in connection with FIG. 1, FIG. 2 shows a side diagrammatic view of angular rate sensor 20 along section lines 2-2 of FIG. 1. In order to detect angular velocity about X-axis 68, angular rate sensor 20 includes electrodes 78 and 80 disposed on surface 26 of substrate 22 beneath first and second sense masses 36 and 38, respectively. As will be demonstrated below, angular velocity about X-axis 68 is sensed along a sense axis that is substantially perpendicular to surface 26 of substrate 22. This sense axis is Z-axis 64 (i.e., the first axis in the three-dimensional coordinate system described herein). Only two electrodes 78 and 80 are shown for simplicity of illustration. It should be apparent to those skilled in the art that multiple electrodes may be disposed in various configurations beneath each of first and second sense masses 36 and 38 on opposing sides of X-axis 68.

Referring to FIG. 3 in connection with FIG. 1, FIG. 3 shows a side diagrammatic view of angular rate sensor 20 along section lines 3-3 of FIG. 1. In order to detect angular velocity about Y-axis 66, angular rate sensor 20 includes electrodes 82 and 84 disposed on surface 26 of substrate 22 beneath third and fourth sense masses 40 and 42, respectively. As will be demonstrated below, angular velocity about Y-axis 66 is sensed along a sense axis that is substantially perpendicular to surface 26 of substrate 22. This sense axis is Z-axis 64 (i.e., the first axis in the three-dimensional coordinate system described herein). Only two electrodes 82 and 84 are shown for simplicity of illustration. It should be apparent to those skilled in the art that multiple electrodes may be disposed in various configurations beneath each of third and fourth sense masses 40 and 42 on opposing sides of Y-axis 66.

A method of fabricating angular rate sensor 20 generally entails forming drive mass 24 flexibly coupled to surface 26 of substrate 22 via spring anchorage structures 28 and enabled to move with oscillatory rotary motion about a first axis, i.e., Z-axis 64, that is substantially perpendicular to surface 26 of substrate 22, where drive mass 24 includes central opening 30 defined by inner perimeter 32. Methodology further includes forming coupler element 34 in central opening 30 and suspended above surface 26 of substrate 22, and forming first sense mass 36, second sense mass 38, third sense mass 40, and fourth sense mass 42 in central opening 30. Additional operations of the fabrication methodology entail interconnecting first sense mass 36 between inner perimeter 32 of drive mass 24 and coupler element 34 via first spring elements 44, interconnecting second sense mass 36 between inner perimeter 32 of drive mass 24 and coupler element 34 via second spring elements 46, interconnecting third sense mass 40 between inner perimeter 32 of drive mass 24 and coupler element 34 via first spring elements 48, and interconnecting fourth sense mass 42 between inner perimeter 32 of drive mass 24 and coupler element 34 via fourth spring elements 50 in the positions relative to Y-axis 66 and X-axis 68 described above. In addition, electrodes 78, 80, 82, 84, and fixed electrodes 72 are formed on surface 26 of substrate 22, and movable electrodes 74 are formed extending from edges 76 of sense masses 36, 38, 40, and 42.

Fabrication of angular rate sensor 20 with its various components may be performed using any suitable known or upcoming fabrication process. For example, a fabrication process implements a silicon micromachining fabrication process that results in structural layers and sacrificial layers that are appropriately deposited, patterned, and etched to produce the suspended structures of angular rate sensor.

Figure 4:
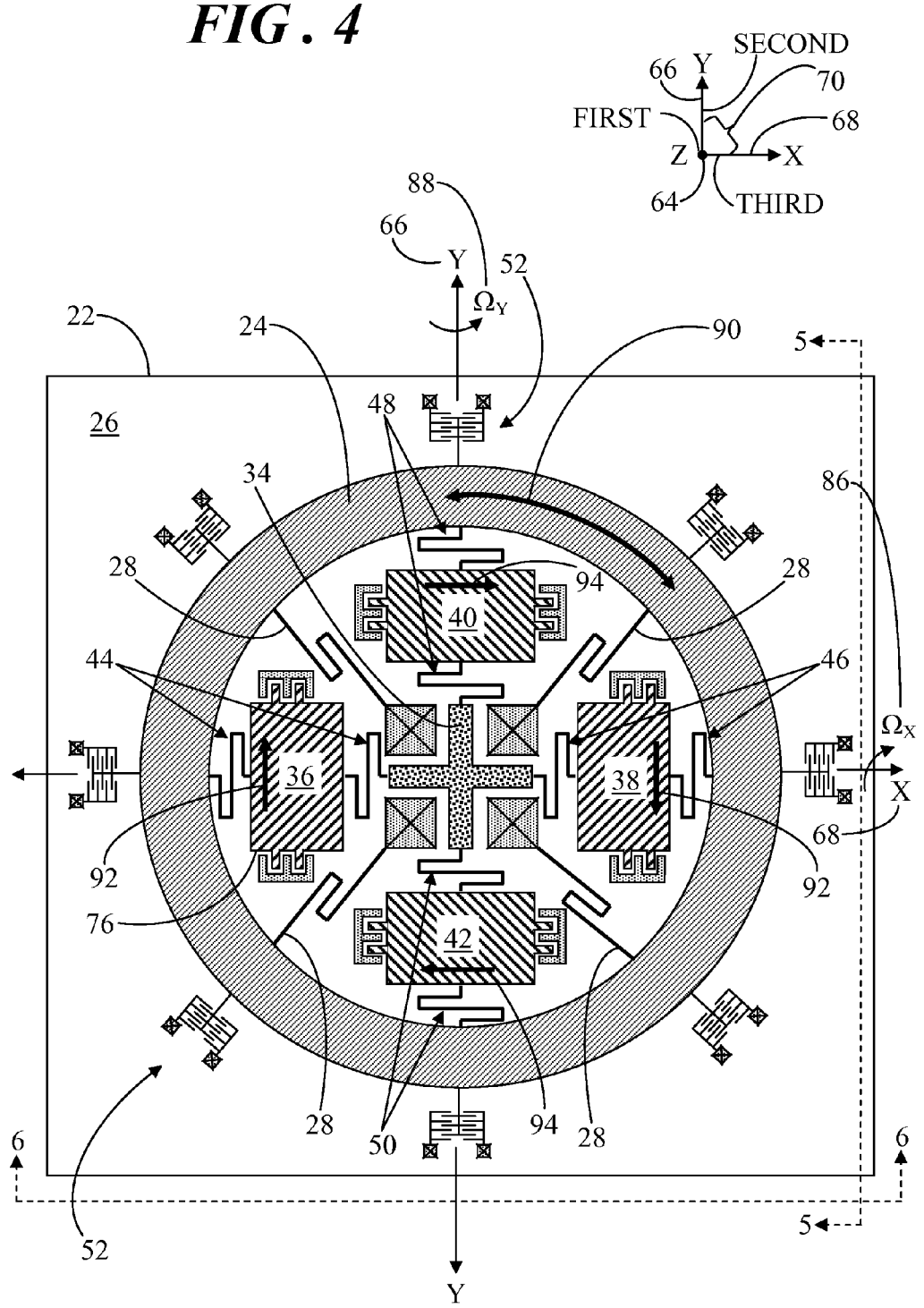
FIG. 4 shows a top view of the angular rate sensor demonstrating the operation of the sensor under X-axis angular velocity and Y-axis angular velocity.

FIG. 4 shows a top view of angular rate sensor 20 demonstrating the operation of sensor 20 under X-axis angular velocity 86, $\Omega_X$, and Y-axis angular velocity 88, $\Omega_Y$. During operation, an oscillator circuit (not shown) of drive system 52 will lock into the drive resonance of angular rate sensor 20 so that angular rate sensor 20 operates at that single drive frequency. That is, drive mass 24 will undergo oscillatory rotary motion, represented by a bi-directional curved arrow 90. Oscillatory rotary motion 90 of drive mass 24 imparts a linear drive motion, represented by straight arrows 92, on first and second sense masses 36 and 38 in a drive direction substantially parallel to Y-axis 66, i.e., the second axis, via first and second spring elements 44 and 46, respectively. Additionally, oscillatory rotary motion 90 of drive mass 24 imparts a linear drive motion, represented by straight arrows 94, on third and fourth sense masses 40 and 42 in a drive direction substantially parallel to X-axis 68, i.e., the third axis, via third and fourth spring elements 48 and 50, respectively.

Spring anchorage structures 28 are suitably configured such that drive mass 24 rotates about Z-axis 64 under electrostatic stimulus from drive system 52. In an embodiment, spring elements 44, 46, 48, and 50 are stiff against, i.e., resistant to, in-plane rotation about Z-axis 64 in order to have strong coupling between drive mass 24 and respective sense masses 36, 38, 40, and 42. The interconnection of spring elements 44 and 46 via coupler element 34 enables first and second sense masses 36 and 38, respectively, to undergo linear drive motion 92 in anti-phase, i.e., one hundred eighty degrees out-of-phase, relative to one another (denoted by oppositely directed arrows). Likewise, the interconnection of spring elements 48 and 50 via coupler element 34 enables third and fourth sense masses 40 and 42, respectively, to undergo linear drive motion 94 in anti-phase relative to one another (denoted by oppositely directed arrows).

Figure 5:
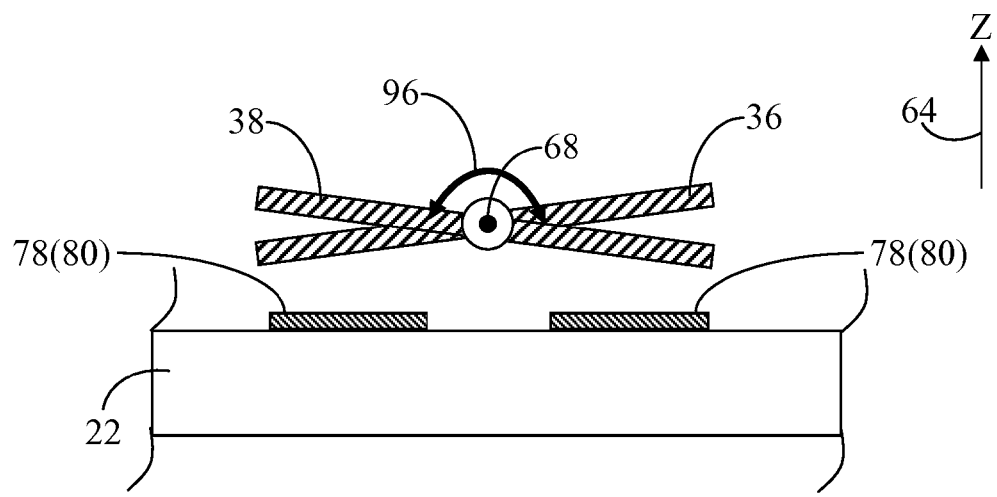
FIG. 5 shows a side view of a portion of the angular rate sensor demonstrating sense motion of a pair of sense masses of the sensor under X-axis angular velocity.

Referring to FIG. 5 in connection with FIG. 4, FIG. 5 shows a side view of a portion of angular rate sensor 20 (viewed form line 5-5 in FIG. 4) demonstrating sense motion 96 of first and second sense masses 36 and 38 of sensor 20 under X-axis angular velocity 86. Coupler element 34 and spring elements 44 and 46 are configured such that they are resistant to translation in and out of X-Y plane 70, but are compliant to rotational movement around X-axis 68. In an embodiment of angular rate sensor 20, Kz may be defined as the out-of-plane stiffness of spring elements 44 and 46, and Krx may be defined as the torsional spring constant around X-axis 68. Spring elements 44 and 46 may be suitably configured such that out-of-plane stiffness, Kz, is greater than torsional spring constant, Krx. Thus, coupler element 34 will have a tendency to rotate about X-axis 68, instead of translating in and out of plane 70, under X-axis angular velocity 86. When coupler element 34 rotates about X-axis 68, coupler element 34 compels first and second sense masses 36 and 38 to rock in anti-phase, i.e., one hundred eighty degrees out of phase, with respect to one another in response to X-axis angular velocity 86.

Thus, spring elements 44 and 46, together with coupler element 34, enable first and second masses 36 and 38 to oscillate relative to a sense axis, i.e., Z-axis 64, that is perpendicular to the drive axis, i.e., Y-axis 66, in response to X-axis angular velocity 86 about an input axis, where the input axis, is X-axis 68. That is, the input X-axis angular velocity 86 creates a Coriolis force on first and second sense masses 36 and 38, which cause them to pivot in and out of plane in anti-phase, i.e., cause them to rock about X-axis 68. The X-axis angular rate information can therefore be obtained and output by ASIC 63 (FIG. 1) by detecting the differential capacitance change between first sense mass 36 and its underlying electrode(s) 78 and between second sense masse 38 and its underlying electrode(s) 80 in a known manner to determine X-axis angular velocity 86.

Figure 6:
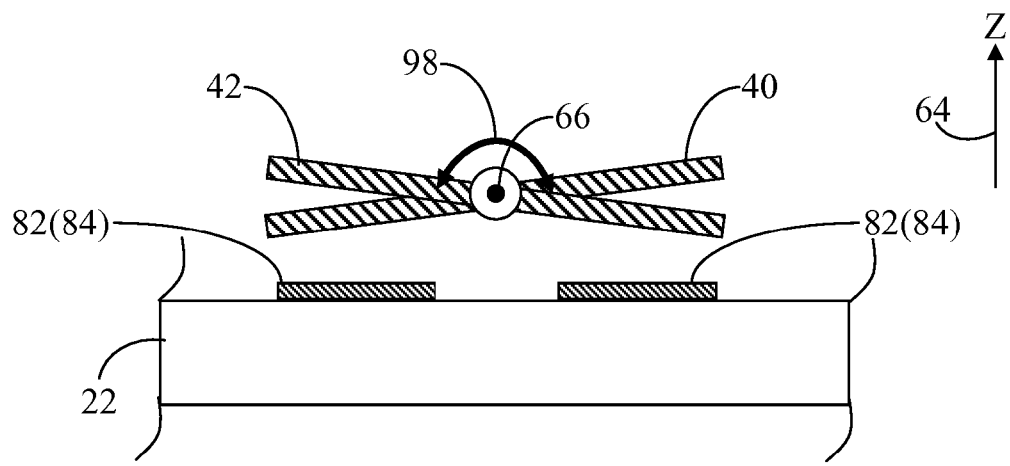
FIG. 6 shows a side view of a portion of the angular rate sensor demonstrating sense motion of another pair of sense masses of the sensor under Y-axis angular velocity.

Referring now to FIG. 6 in connection with FIG. 4, FIG. 6 shows a side view of a portion of angular rate sensor 20 (viewed from line 6-6 in FIG. 4) demonstrating sense motion 98 of third and fourth sense masses 40 and 42 of sensor 20 under Y-axis angular velocity 88. Coupler element 34 and spring elements 48 and 50 are configured such that they are resistant to translation in and out of X-Y plane 70, but are compliant to rotational movement around Y-axis 66. In an embodiment of angular rate sensor 20, spring elements 48 and 50 may be suitably configured such that their out-of-plane stiffness, Kz, is greater than their torsional spring constant, Kry, around Y-axis 66. Thus, coupler element 34 will additionally have a tendency to rotate about Y-axis 66, instead of translating in and out of plane 70, under Y-axis angular velocity 88. When coupler element 34 rotates about Y-axis 66, coupler element 34 compels third and fourth sense masses 40 and 42 to move in anti-phase, i.e., one hundred eighty degrees out of phase, with respect to one another in response to Y-axis angular velocity 88.

Thus, spring elements 48 and 50, together with coupler element 34, enable third and fourth masses 40 and 42 to oscillate relative to a sense axis, i.e., Z-axis 64, that is perpendicular to the drive axis, i.e., X-axis 68, in response to Y-axis angular velocity 88 about an input axis, where the input axis, is Y-axis 66. That is, the input Y-axis angular velocity 88 creates a Coriolis force on third and fourth sense masses 40 and 42, which cause them to pivot in and out of plane in anti-phase, i.e., cause them to rock about Y-axis 66. The Y-axis angular rate information can therefore be obtained and output by ASIC 63 (FIG. 1) by detecting the differential capacitance change between third sense mass 40 and its underlying electrode(s) and between fourth sense mass 42 and its underlying electrode(s) 84 in a known manner to determine Y-axis angular velocity 88. In alternative embodiments, the displacement of sense masses 36, 38, 40, and 42 may be detected using a different technique rather than by differential capacitance such as, for example, by detecting a magnetic force.

Figure 7:
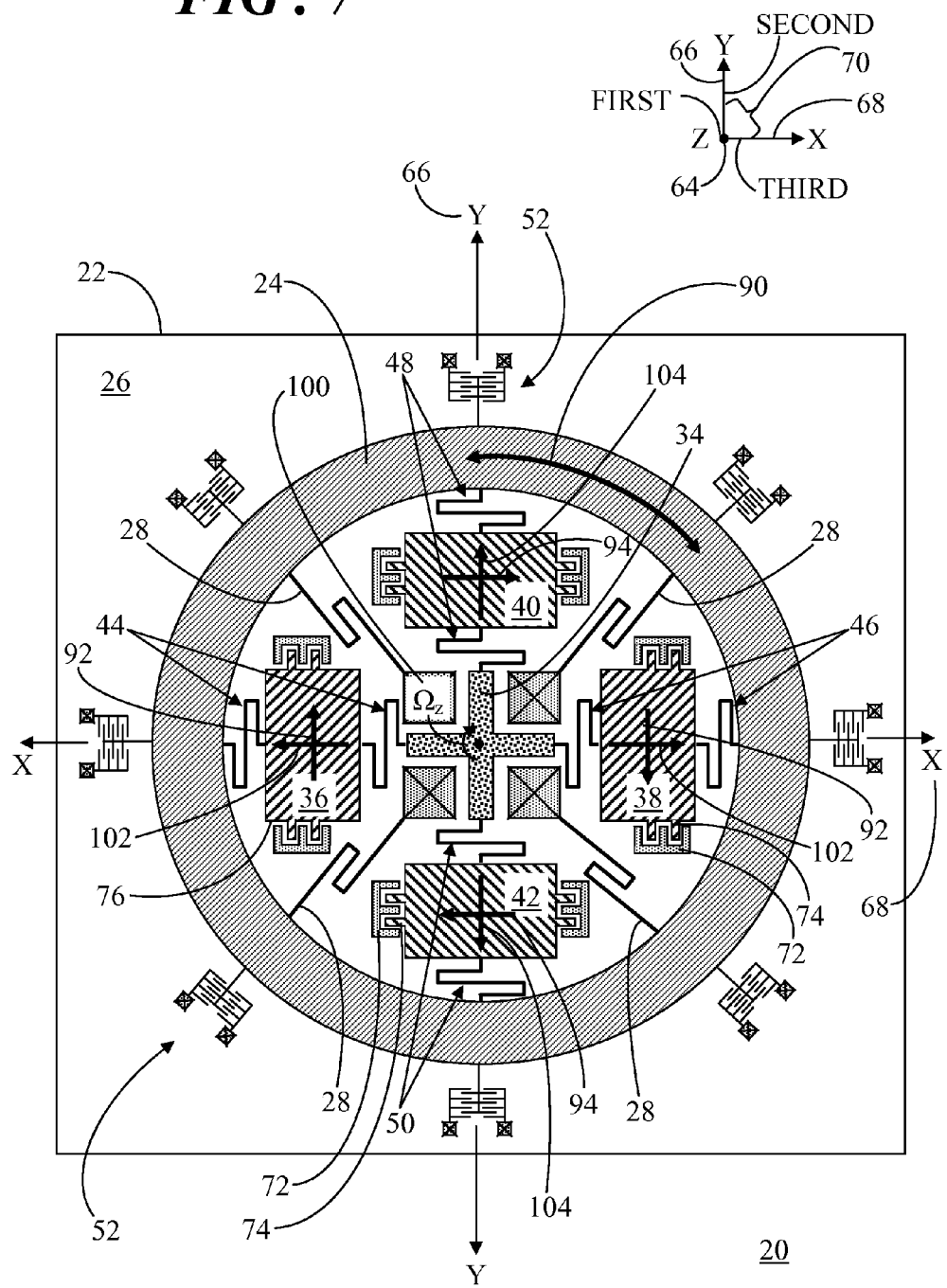
FIG. 7 shows a top view of the angular rate sensor demonstrating the operation of the sensor under Z-axis angular velocity.

FIG. 7 shows a top view of angular rate sensor 20 demonstrating the operation of sensor 20 under Z-axis angular velocity 100. Spring elements 44, 46, 48, and 50 are further configured such that they are compliant in the radial direction. That is, spring elements 44 and 46 are compliant substantially parallel to X-axis 68, and spring elements 48 and 50 are compliant substantially parallel to Y-axis 66. Thus, the input Z-axis angular velocity 100 creates a Coriolis force on first and second sense masses 36 and 38 which imparts a sense motion, represented by arrows 102, on sense masses 36 and 38 in a direction that is substantially parallel to X-axis 68. However, first and second sense masses 36 and 38 oscillate in anti-phase, i.e., oppose directions (denoted by oppositely directed arrows for sense motion 102). Likewise, the input Z-axis angular velocity 100 creates a Coriolis force on third and fourth sense masses 40 and 42 which imparts a sense motion, represented by arrows 104, in a direction that is substantially parallel to Y-axis 66. However, third and fourth sense masses 40 and 42 oscillate in anti-phase, i.e., oppose directions (denoted by oppositely directed arrows for sense motion 104).

The Z-axis angular rate information can therefore be obtained output by ASIC 63 (FIG. 1) by detecting the differential capacitance change between fixed electrodes 72 and movable electrodes 74 along edges 76 of sense masses 36 and 38, as well as between fixed electrodes 72 and movable electrodes 74 along edges 76 of sense masses 40 and 42 to determine Z-axis angular velocity 100. For example, by subtracting the capacitance signals detected between electrodes 72 and 74 of sense masses 36 and 38 from one another, it is possible to measure the Coriolis contribution, and therefore angular rate about the input axis, i.e., Z-axis 64. Likewise, by subtracting the capacitance signals detected between electrodes 72 and 74 of sense masses 40 and 42 from one another, it is possible to measure the Coriolis contribution, and therefore angular rate about the input axis, i.e., Z-axis 64. The respective capacitance signals can then be suitably combined to obtain the Z-axis angular rate information. Measurements from four sense masses 36, 38, 40, and 42 are utilized herein to obtain the Z-axis angular rate information. However, in alternative embodiments, Z-axis angular rate information may be determined using two sense masses that oppose one another, e.g., sense masses 36 and 38, or sense masses 40 and 42.

Each of sense masses 36, 38, 40, and 42 may be subjected to centripetal force which is caused by the drive motion. i.e., oscillatory rotary motion 90. This centripetal force may be represented by the following formula:

$$F_{cen} = \tfrac{1}{2} m \phi_d^2 \omega_d^2 R(1+\cos(2\omega_d t)) \quad (1)$$

and the Coriolis force is represented by the following formula:

$$F_{cor} = 2m\Omega_d \phi_d \omega_d R \cos(\omega_d t) \quad (2)$$

where, $\phi_d$ is the drive amplitude, $\omega_d$ is the drive frequency, R is the radius of drive mass 24, and $\Omega_d$ is angular rate. Accordingly, the centripetal force, $F_{cen}$, has two components. These two components include a DC component and a component that is two times the drive frequency, $\omega_d$. That is, the centripetal force appears at DC (zero frequency) and at two times the drive frequency. This centripetal force may be filtered out, i.e., suppressed, via a low-pass filter without impacting the Coriolis force.

However, if the centripetal force is too large, it might saturate the ASIC front end. The ratio between centripetal force and Coriolis force amplitude is:

$$\frac{F_{cen}}{F_{cor}} = \frac{\tfrac{1}{2} m \phi_d^2 \omega_d^2 R(1+\cos(2\omega_d t))}{2m\Omega_d \phi_d \omega_d R \cos(\omega_d t)} \quad (3)$$

In an example, with a five micron drive amplitude, a one millimeter radius of the drive disk, ten kilohertz drive frequency, and 1600 dps full scale angular rate, this produces the ratio as follows:

$$\frac{F_{cen}}{F_{cor}} = \frac{(5/1000)2\pi 10^4}{4 \times 1600(\pi/180)} = 2.8 \quad (4)$$

This ratio is manageable by ASIC 63 by properly designing the dynamic range of ASIC 63.

The effect of centripetal force may be further suppressed by the sense oscillator dynamics. If angular rate sensor 20 is operated at mode-matching, i.e., the two resonance modes (drive and sense) have the same resonant frequencies, then the response from the Coriolis force is further amplified by the Q factor of the sense oscillator, where Q can be two hundred or higher. This means that the ratio of the centripetal force to the Coriolis force can be further reduced. Accordingly, centripetal force (acceleration) may be effectively suppressed by the sense oscillator dynamics and circuit trimming (filtering), as needed.

In summary, embodiments entail a microelectromechanical systems (MEMS) device in the form of, for example, an angular rate sensor having a single drive mass and including four distributed sense masses located within a central opening of the drive mass. The drive mass is connected to the underlying substrate via spring anchorage structures that enable the drive mass to rotate around the Z-axis under electrostatic stimulus, which is the drive motion. Use of a single drive mass enables the implementation of a single drive frequency, which simplifies the drive circuitry and reduces cross talk. The sense masses are coupled to the drive mass by spring elements such that oscillatory rotary motion of the drive mass results in a linear drive motion of the sense masses. The distributed sense masses form two pairs of sense masses, where one pair senses X- and Z-axis angular rate and the other pair senses Y- and Z-axis angular rate. Additionally, the sense masses are coupled to one another via a centrally located coupler to ensure that the sense masses of each pair are moving one hundred eighty degrees out of phase with respect to each other. These features can enable multiple axis sensing capability, more efficient die area utilization, and suitability for low cost mass production.

Although the preferred embodiments of the invention have been illustrated and described in detail, it will be readily apparent to those skilled in the art that various modifications may be made therein without departing from the spirit of the invention or from the scope of the appended claims. That is, it should be appreciated that the exemplary embodiments are only examples, and are not intended to limit the scope, applicability, or configuration of the invention. For example, the above presented features may be adapted for dual-axis sensing of angular velocity about X- and Y-axes, X- and Z-axes, or Y- and Z-axes. Additionally, the above presented features may be adapted to include more than four distributed sense masses.

What is claimed is:

1. An angular rate sensor comprising:
a substrate having a surface;
a drive mass flexibly coupled to said substrate, said drive mass being configured to move with an oscillatory rotary drive motion about a first axis that is substantially perpendicular to said surface of said substrate, said drive mass having a central opening defined by an inner perimeter;
a coupler element located in said central opening and suspended above said surface of said substrate;
a first sense mass located in said central opening and interconnected between said inner perimeter of said drive mass and said coupler element via first spring elements;
a second sense mass located in said central opening and interconnected between said inner perimeter of said drive mass and said coupler element via second spring elements, said first and second sense masses being positioned on opposing sides of a second axis with said coupler element located between said first and second sense masses, said second axis being oriented substantially parallel to said surface of said substrate, wherein said oscillatory rotary drive motion of said drive mass imparts a linear drive motion on said first and second sense masses via said first and second spring elements, said linear drive motion being in a first drive direction substantially parallel to said second axis.

2. An angular rate sensor as claimed in claim 1 wherein flexible interconnection of said coupler element with each of said first and second sense masses via said first and second spring elements enables anti-phase motion of said first and second sense masses in said first drive direction substantially parallel to said second axis in response to said linear drive motion.

3. An angular rate sensor as claimed in claim 1 wherein said first and second spring elements enable said first and second sense masses to oscillate relative to a sense axis that is perpendicular to said second axis in response to an angular velocity about an input axis, said input axis being perpendicular to each of said second axis and said sense axis.

4. An angular rate sensor as claimed in claim 3 further comprising electrodes disposed on said surface of said substrate beneath each of said first and second sense masses, wherein said input axis is substantially parallel to said surface of said substrate and said sense axis is substantially perpendicular to said surface of said substrate.

5. An angular rate sensor as claimed in claim 3 further comprising fixed electrodes anchored to said substrate and movable electrodes extending from edges of said first and second sense masses, said movable electrodes located proximate said fixed electrodes, said fixed and movable electrodes being longitudinally aligned with said second axis.

6. An angular rate sensor as claimed in claim 5 wherein a second input axis is substantially perpendicular to said surface of said substrate and a second sense axis is substantially parallel to said surface of said substrate.

7. An angular rate sensor as claimed in claim 1 further comprising:
a third sense mass located in said central opening and interconnected between said inner perimeter of said drive mass and said coupler element via third spring elements; and
a fourth sense mass located in said central opening and interconnected between said inner perimeter of said drive mass and said coupler element via fourth spring elements, said third and fourth sense masses being positioned on opposing sides of a third axis with said coupler element located between said third and fourth sense masses, said third axis being oriented substantially parallel to said surface of said substrate and perpendicular to said second axis, wherein said oscillatory rotary drive motion of said drive mass imparts said linear drive motion on said third and fourth drive masses via said third and fourth spring elements, said linear drive motion being imparted on said third and fourth drive masses in a second drive direction substantially parallel to said third axis.

8. An angular rate sensor as claimed in claim 7 wherein flexible interconnection of said coupler element with each of said third and fourth sense masses via said third and fourth spring elements enables anti-phase motion of said third and fourth sense masses in said second drive direction substantially parallel to said third axis in response to said linear drive motion.

9. An angular rate sensor as claimed in claim 7 wherein:
said third spring elements enable said third sense mass to oscillate relative to a sense axis that is perpendicular to said third axis in response to an angular velocity about an input axis, said input axis being perpendicular to each of said third axis and said sense axis; and
said fourth spring elements enable said fourth sense mass to oscillate relative to said sense axis in response to said angular velocity about said input axis.

10. An angular rate sensor as claimed in claim 9 further comprising electrodes disposed on said surface of said substrate beneath each of said third and fourth sense masses, wherein said input axis is substantially parallel to said surface of said substrate and said sense axis is substantially perpendicular to said surface of said substrate.

11. An angular rate sensor as claimed in claim 10 wherein said angular velocity is a first angular velocity, said input axis is a first input axis, said electrodes are first electrodes, and said angular rate sensor further comprises second electrodes disposed on said surface of said substrate beneath each of said first and second sense masses, wherein said first and second spring elements enable said first and second sense masses to oscillate relative to said sense axis in response to a second angular velocity about a second input axis, said second input axis being substantially parallel to said surface of said substrate, and said second input axis being perpendicular to each of said first input axis and said sense axis.

12. An angular rate sensor as claimed in claim 11 wherein said sense axis is a first sense axis, and said angular rate sensor further comprises:
first movable electrodes extending from edges of said first and second sense masses and first fixed electrodes anchored to said substrate, said first fixed electrodes positioned proximate said first movable electrodes, said first movable electrodes and said first fixed electrodes being longitudinally aligned with said second axis;
second movable electrodes extending from edges of said third and fourth sense masses and second fixed electrodes anchored to said substrate, said second fixed electrodes positioned proximate said second movable electrodes, said second movable electrodes and said second fixed electrodes being longitudinally aligned with said third axis; wherein
said first and second spring elements enable said first and second sense masses to oscillate relative to a second sense axis in response to a third angular velocity about a third input axis, said third input axis being substantially perpendicular to said surface of said substrate, and said second sense axis being substantially parallel to said surface of said substrate; and said third and fourth spring elements enable said third and fourth sense masses to oscillate relative to a third sense axis in response to said third angular velocity about said third input axis, said third sense axis being substantially parallel to said surface of said substrate and substantially perpendicular to said second sense axis.

13. An angular rate sensor as claimed in claim 9 further comprising fixed electrodes anchored to said substrate and movable electrodes extending from edges of said third and fourth sense masses, said movable electrodes located proximate said fixed electrodes, said fixed and movable electrodes being longitudinally aligned with said third axis, wherein said input axis is substantially perpendicular to said surface of said substrate and said sense axis is substantially parallel to said surface of said substrate.

14. A method of fabricating a microelectromechanical systems (MEMS) angular rate sensor comprising:
forming a drive mass flexibly coupled to a substrate and enabled to move with an oscillatory rotary drive motion about a first axis that is substantially perpendicular to a surface of said substrate, said drive mass including a central opening defined by an inner perimeter;
forming a coupler element in said central opening and suspended above said surface of said substrate;
forming a first sense mass, a second sense mass, a third sense mass, and a fourth sense mass in said central opening;
forming first spring elements between said first sense mass and said inner perimeter of said drive mass and between said first sense mass and said coupler element;
forming second spring elements between said second sense mass and said inner perimeter of said drive mass and between said second sense mass and said coupler element, said first and second sense masses being positioned on opposing sides of a second axis with said coupler element located between said first and second sense masses, said second axis being oriented substantially parallel to said surface of said substrate, said first and second sense masses being enabled to undergo a linear drive motion via said first and second spring elements in response to said oscillatory rotary drive motion, said linear drive motion being in a first drive direction substantially parallel to said second axis;
forming third spring elements between said third sense mass and said inner perimeter of said drive mass and between said third sense mass and said coupler element;
forming fourth spring elements between said fourth sense mass and said inner perimeter of said drive mass and between said fourth sense mass and said coupler element, said third and fourth sense masses being positioned on opposing sides of a third axis with said coupler element located between said third and fourth sense masses, said third axis being oriented substantially parallel to said surface of said substrate and perpendicular to said second axis, said third and fourth sense masses being enabled to undergo said linear drive motion via said third and fourth spring elements in response to said oscillatory rotary drive motion, said linear drive motion being imparted on said third and fourth drive masses in a second drive direction substantially parallel to said third axis.

15. A method as claimed in claim 14 further comprising:
forming first electrodes on said surface of said substrate beneath each of said first and second sense masses; and
forming second electrodes on said surface of said substrate beneath each of said third and fourth sense masses; wherein
said first and second spring elements enable said first and second sense masses to oscillate relative to a sense axis that is perpendicular to said surface of said substrate in response to an angular velocity about a first input axis that is substantially parallel to said third axis; and
said third and fourth spring elements enable said third and fourth sense masses to oscillate relative to said sense axis in response to said angular velocity about a second input axis that is substantially parallel to said second axis.

16. A method as claimed in claim 15 further comprising:
forming first movable electrodes extending from edges of said first and second sense masses;
forming first fixed electrodes anchored to said substrate, said first fixed electrodes being positioned proximate said first movable electrodes, said first movable electrodes and said first fixed electrodes being longitudinally aligned with said second axis;
forming second movable electrodes extending from edges of said third and fourth sense masses; and
forming second fixed electrodes anchored to said substrate, said second fixed electrodes being positioned proximate said second movable electrodes, said second movable electrodes and said second fixed electrodes being longitudinally aligned with said third axis; wherein
said first and second spring elements enable said first and second sense masses to oscillate relative to a second sense axis in response to said angular velocity about a third input axis that is substantially perpendicular to said surface of said substrate, and said second sense axis being substantially parallel to said surface of said substrate; and
said third and fourth spring elements enable said third and fourth sense masses to oscillate relative to a third sense axis in response to said angular velocity about said third input axis, said third sense axis being substantially perpendicular to said second sense axis.

17. An angular rate sensor comprising:
a substrate having a surface;
a drive mass flexibly coupled to said substrate, said drive mass being configured to move with an oscillatory rotary drive motion about a first axis that is substantially perpendicular to said surface of said substrate, said drive mass having a central opening defined by an inner perimeter;
a coupler element located in said central opening and suspended above said surface of said substrate;
a first sense mass located in said central opening and interconnected between said inner perimeter of said drive mass and said coupler element via first spring elements;
a second sense mass located in said central opening and interconnected between said inner perimeter of said drive mass and said coupler element via second spring elements, said first and second sense masses being positioned on opposing sides of a second axis with said coupler element located between said first and second sense masses, said second axis being oriented substantially parallel to said surface of said substrate;
first electrodes disposed on said surface of said substrate beneath each of said first and second sense masses;
first fixed electrodes anchored to said substrate and first movable electrodes extending from edges of said first and second sense masses, said first movable electrodes being positioned proximate said first fixed electrodes, said first fixed electrodes and first movable electrodes being longitudinally aligned with said second axis; wherein said oscillatory rotary drive motion of said drive mass imparts a linear drive motion on said first and second sense masses via said first and second spring elements, said linear drive motion being in a first drive direction substantially parallel to said second axis;

said first and second spring elements enable said first and second sense masses to oscillate relative to a first sense axis in response to an angular velocity about a first input axis, said first sense axis being substantially perpendicular to said surface of said substrate, and said first input axis being substantially parallel to said surface of said substrate and substantially perpendicular to said second axis; and said first and second spring elements enable said first and second sense masses to oscillate relative to a second sense axis in response to said angular velocity about a second input axis, said second sense axis being substantially parallel to said surface of said substrate, and said second input axis being substantially perpendicular to said surface of said substrate.

18. An angular rate sensor as claimed in claim 17 further comprising:
a third sense mass located in said central opening and interconnected between said inner perimeter of said drive mass and said coupler element via third spring elements; and
a fourth sense mass located in said central opening and interconnected between said inner perimeter of said drive mass and said coupler element via fourth spring elements, said third and fourth sense masses being positioned on opposing sides of a third axis with said coupler element located between said third and fourth sense masses, said third axis being oriented substantially parallel to said surface of said substrate and perpendicular to said second axis;
second electrodes disposed on said surface of said substrate beneath each of said third and fourth sense masses; wherein
said oscillatory rotary drive motion of said drive mass imparts said linear drive motion on said third and fourth drive masses via said third and fourth spring elements, said linear drive motion being imparted on said third and fourth drive masses in a second drive direction substantially parallel to said third axis;
said third and fourth spring elements enable said third and fourth sense masses to oscillate relative to said first sense axis in response to said angular velocity about a third input axis, said third input axis being substantially parallel to said surface of said substrate and substantially perpendicular to said third axis.

19. An angular rate sensor as claimed in claim 18 further comprising:
second fixed electrodes anchored to said substrate and second movable electrodes extending from edges of said third and fourth sense masses, said second movable electrodes being positioned proximate said second fixed electrodes, said second fixed electrodes and second movable electrodes being longitudinally aligned with said third axis; wherein
said third and fourth spring elements enable said third and fourth sense masses to oscillate relative to said second sense axis in response to said angular velocity about said second input axis, said second sense axis being substantially parallel to said surface of said substrate, and said second input axis being substantially perpendicular to said surface of said substrate.

20. An angular rate sensor as claimed in claim 18 wherein:
flexible interconnection of said coupler element with each of said first and second sense masses via said first and second spring elements enables anti-phase motion of said first and second sense masses in said first drive direction substantially parallel to said second axis in response to said linear drive motion; and
flexible interconnection of said coupler element with each of said third and fourth sense masses via said third and fourth spring elements enables said anti-phase motion of said third and fourth sense masses in said second drive direction substantially parallel to said third axis in response to said linear drive motion.

* * * * *